United States Patent
Lu et al.

(10) Patent No.: US 11,928,672 B2
(45) Date of Patent: Mar. 12, 2024

(54) PERSONALIZATION METHOD AND SYSTEM FOR FINANCIAL IC CARD HAVING DYNAMIC VERIFICATION CODE

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 241 days.

(21) Appl. No.: 17/270,793

(22) PCT Filed: Aug. 27, 2019

(86) PCT No.: PCT/CN2019/102745
§ 371 (c)(1),
(2) Date: Feb. 23, 2021

(87) PCT Pub. No.: WO2020/048351
PCT Pub. Date: Mar. 12, 2020

(65) Prior Publication Data
US 2021/0342827 A1    Nov. 4, 2021

(30) Foreign Application Priority Data

Sep. 7, 2018 (CN) .......................... 201811045612.7

(51) Int. Cl.
*G06Q 20/38* (2012.01)
*G06Q 20/34* (2012.01)
(Continued)

(52) U.S. Cl.
CPC ....... *G06Q 20/3821* (2013.01); *G06Q 20/355* (2013.01); *G06Q 20/3829* (2013.01);
(Continued)

(58) Field of Classification Search
CPC ................................................. G06Q 20/3821
(Continued)

(56) References Cited

U.S. PATENT DOCUMENTS

2016/0253657 A1* 9/2016 Sohn ...................... G06Q 20/40
                                                                705/44
2016/0263657 A1   9/2016 Sohn et al.

* cited by examiner

*Primary Examiner* — Rafferty D Kelly
(74) *Attorney, Agent, or Firm* — Hammer & Associates, P.C.

(57) ABSTRACT

A personalization method for a financial IC card having a dynamic verification code, comprising: an upper apparatus organizes second personalization information comprising a second disperse key, and organizes a personalization data packet according to the second personalization information; after the upper apparatus and a personalization device establish a security channel, if the upper apparatus transmits the personalization data packet to the personalization device by means of the security channel, the personalization device writes the second personalization information into a financial IC card; if the upper apparatus transmits a verification request to the personalization device by means of the security channel, the personalization device reads a time window and a dynamic verification code from the financial IC card, returns the time window and the dynamic verification code to the upper apparatus by means of the security channel for verification, receives a verification result returned by the upper apparatus by means of the security channel, and if the verification is successful, reads a personalization state in the financial IC card and saves the personalization state, and returns personalization success information to the upper apparatus by means of the security channel.

10 Claims, 5 Drawing Sheets

(51) Int. Cl.
 *G07F 7/08* (2006.01)
 *G07F 7/12* (2006.01)
 *H04L 9/08* (2006.01)
(52) U.S. Cl.
 CPC ............... *G07F 7/08* (2013.01); *G07F 7/122* (2013.01); *H04L 9/0869* (2013.01); *H04L 2209/56* (2013.01)
(58) Field of Classification Search
 USPC ........................................................ 235/380
 See application file for complete search history.

PERSONALIZATION METHOD AND SYSTEM FOR FINANCIAL IC CARD HAVING DYNAMIC VERIFICATION CODE

FIELD OF THE INVENTION

The present invention relates to a financial IC card, particularly to a personalized method for a financial IC card with a dynamic verification code and a system therefor.

PRIOR ART

A financial IC card, which is also called as a chip bank card, is issued by a bank or a payment agency. The card adopts an integrated circuit technology and accord with a national financial industry standard, while the IC card has all of or part of functions such as consumption credit, transfer and balance, cash access.

In the definition of the card organization, a user executes a transaction just by inputting a card number, a name, an expiry data and a verification code when the user does not get the card. Because of leak of such information, internet frauds often frustrate the user of IC cards, and the financial IC card with dynamic verification code can update the verification code automatically; in this way, it is effective to against any internet fraud when the user has no the card in hand.

But, at present, the personalized system of the financial IC card cannot meet the request of the financial IC card with the dynamic verification code, so that the card cannot prevent the user from the internet frauds.

SUMMARY OF THE INVENTION

The object of the present invention is to provide a personalized method for a financial IC card with a dynamic verification code and a system therefor, and the financial IC card with the dynamic verification code can update the verification code automatically, that can prevent a user of the financial IC card from being cheated.

Thus, according to one aspect of the present invention, there is provided a personalized method for a financial IC card with a dynamic verification code, including:

Step s1, after an upper equipment builds a security channel with a personalized device, the personalized device executes Step s2 in the case that the upper equipment sends personalized data package to the personalized device via the security channel; the personalized device executes Step s3 in the case that the upper equipment sends a verifying request to the personalized device via the security channel;

Step s2, the personalized device parses the personalized data package to obtain a second personalized information, and writes the second personalized information into a financial IC card, and returns a second personalized information writing result to the upper equipment via the security channel; and continues to wait for receiving data sent from the upper equipment; and Step s3, the personalized device reads a time window and a dynamic verification code from the financial IC card, and returns the time window and the dynamic verification code to the upper equipment for verification, and receives a verification result returned from the upper equipment via the security channel, reads and stores personalized state of the financial IC card if the verification result is successful, and returns the personalized successful information to the upper equipment via the security channel; returns personalized unsuccessful information to the upper equipment via the security channel if the verification result is failure;

before the upper equipment sends personalized data package to the personalized device, the method further includes:

the upper equipment generates or receives the first personalized information including a first master key; disperses the first master key to obtain a second disperse key, organizes a second personalized information including the second disperse key, and organizes the personalized data package according to the second personalized information.

According to another aspect of the present invention, there is provided a personalized system for a financial IC card with a dynamic verification code, the system includes an upper equipment and a personalized device;

the upper equipment includes a first organizing module, a second organizing module, a first building security channel module, a first sending module, a second sending module and a third sending module;

the personalized device includes a second building security channel module, a first receiving module, a first parsing module, a first writing module, a first returning module, a second receiving module, a first reading module, a second returning module, a third receiving module, a first determining module, a second reading module, a first storing module, a third returning module and a fourth returning module;

the first organizing module which is configured to generate or receive the first personalized information including the first master key; and to disperse the first master key to obtain the second dispersing key, and to organize the second personalized information including the second dispersing key;

the second organizing module which is configured to organize personalized data package according to the second personalized information organized by the first organizing module;

the first building security channel module which is configured to build a security channel with the personalized device;

the first sending module which is configured to send the personalized data package organized by the second organizing module to the personalized device via the security channel built by the first building security channel module;

the second sending module which is configured to send a verification request to the personalized device via the security channel built by the first building security channel module;

the third sending module which is configured to send a verification result to the personalized device via the security channel built by the first building security channel module;

the second building security channel module which is configured to build a security channel with the upper equipment;

the first receiving module which is configured to receive the personalized data package sent from the upper equipment via the security channel;

the first parsing module which is configured to parse the personalized data package received by the first receiving module to obtain the second personalized information;

the first writing in module which is configured to write the second personalized information obtained by the first parsing module into the financial IC card;

the first returning module which is configured to return a result of writing the second personalized information to the upper equipment via the security channel;

the second receiving module which is configured to receiving the verification request via the security channel;

the first reading module which is configured to read the time widow and the dynamic verification code from the financial IC card;

the second returning module which is configure to return the time window and the dynamic verification code read by the first reading module to the upper equipment via the security channel;

the third receiving module which is configured to receive the verification result returned by the upper equipment via the security channel;

the first determining module which is configured to determine a type of the verification result received by the third receiving module;

the second reading module which is configured to read a personalized state when the first determining module determines that the received verification result returned by the upper equipment via the security channel is success;

the first storing module which is configured to store the personalized state, returned by the financial IC card, which is read by the second reading module;

the third returning module which is configured to return the personalization successful information to the upper equipment via the security channel when the first determining module determines that the verification result is successful; and the fourth returning module which is configured to return the personalization unsuccessful information to the upper equipment via the security channel when the first determining module determines that the verification result fails.

According to the present disclosure, it provides a personalized method for a financial IC card with a dynamic verification code and a system therefor, which can realize personalization of a financial IC card with a dynamic verification code. In the claimed method, the financial IC card with the dynamic verification code can update the verification code automatically, thus the method can protect the user from fraud.

EMBODIMENTS FOR CARRYING OUT THE INVENTION

In order to make clear the object, the solutions and the merits of the present invention, the embodiments of the present invention will be described in detail together with the accompanying drawings.

Embodiment 1

Figure 1:
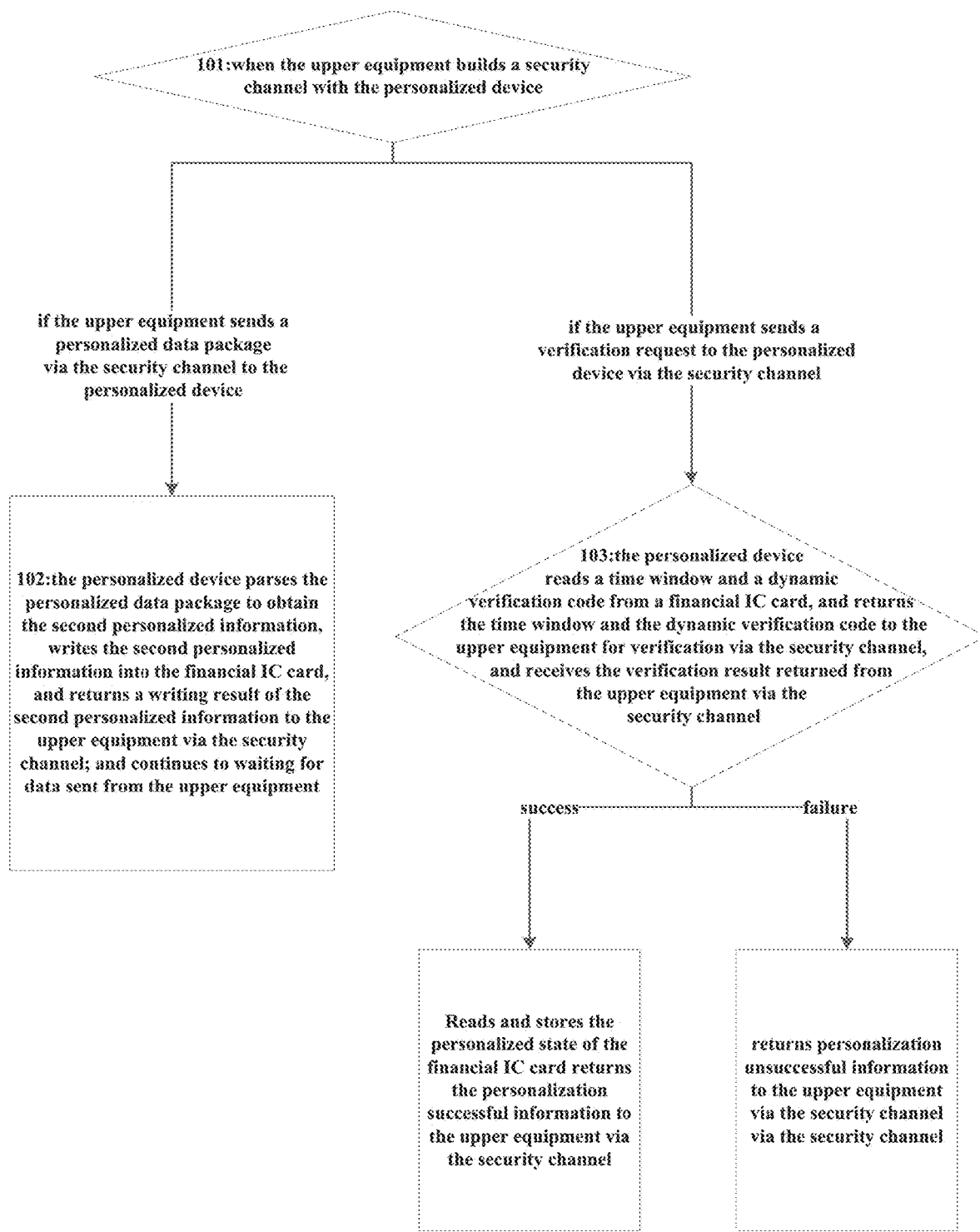
FIG. 1 is a flow diagram of a personalized method for a financial IC card with a dynamic verification code according to Embodiment 1 of the present invention.
Figure 2:
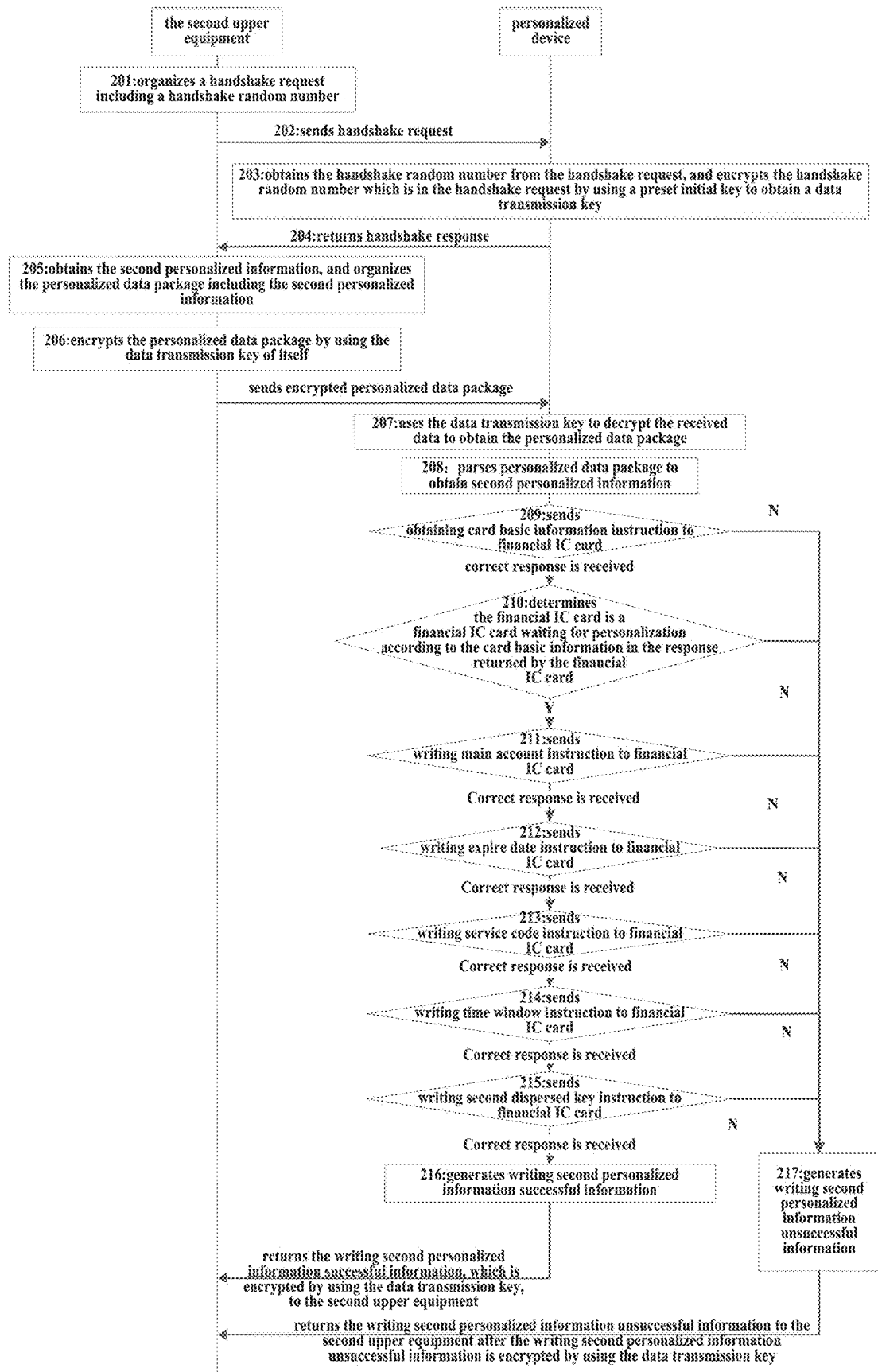
FIG. 2 is a flow diagram of a personalized method for a financial IC card with a dynamic verification code according to Embodiment 2 of the present invention.
Figure 3:
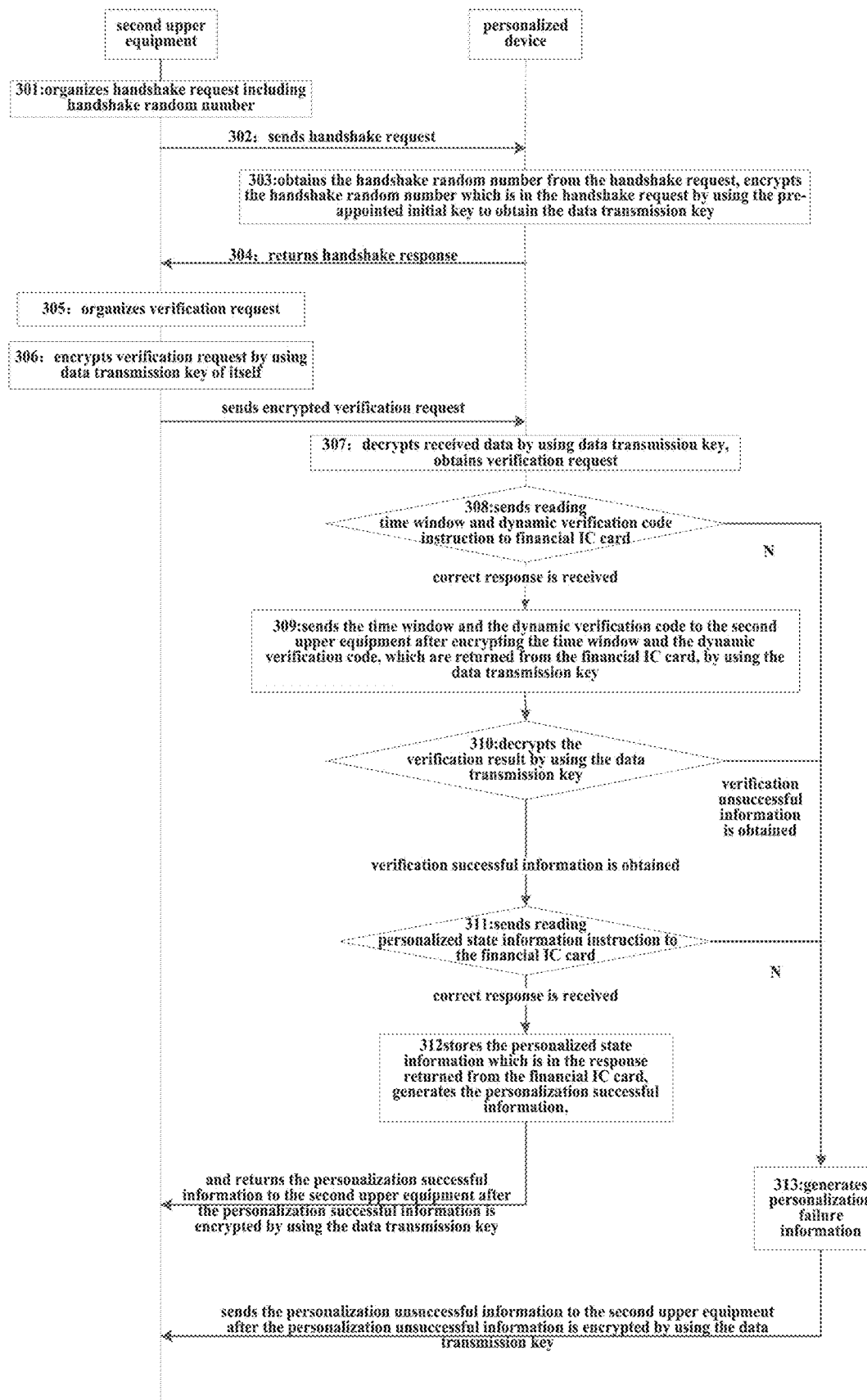
FIG. 3 is a flow diagram of a verification process in a method for a financial IC card with a dynamic verification code according to Embodiment 2 of the present invention.

According to Embodiment 1, it provides a personalized method for a financial IC card with dynamic code, which applies to a personalized system including an upper equipment and a personalized device, as shown in FIG. 1, including the following steps:

step 101, when the upper equipment builds a security channel with the personalized device, the personalized device executes step 102 if the upper equipment sends a personalized data package via the security channel to the personalized device; the personalized device executes step 103 if the upper equipment sends a verification request to the personalized device via the security channel;

step 102, the personalized device parses the personalized data package to obtain the second personalized information, writes the second personalized information into the financial IC card, and returns a writing result of the second personalized information to the upper equipment via the security channel; and continues to waiting for data sent from the upper equipment;

step 103, the personalized device reads a time window and a dynamic verification code from a financial IC card, and returns the time window and the dynamic verification code to the upper equipment for verification via the security channel, and receives the verification result returned from the upper equipment via the security channel, reads and stores the personalized state from the financial IC card, and returns the personalization successful information to the upper equipment via the security channel if the verification result is success; otherwise, returns personalization unsuccessful information to the upper equipment via the security channel via the security channel;

before the upper equipment sends the personalized data package to the personalized device, the method further includes:

the upper equipment generates or receives the first personalized information including the first master key; disperses the first master key to obtain the second dispersed key, organizes the second personalized information including the second dispersed key, and organizes the personalized data package according to the second personalized information.

Or, before the upper equipment sends the personalized data package to the personalized device, the method further includes:

the upper equipment generates a dispersion factor according to a preset card identification information, disperses a preset first master key to obtain the first dispersed key by using the dispersion factor, organizes the first personalized information including the first dispersed key; disperses a preset second master key by using the dispersion factor to obtain the second dispersed key, and organizes the second personalized information including the second dispersed key; and organizes the personalized data package according to the second personalized information.

In Embodiment 1, the upper equipment may include a second upper equipment and a third upper equipment;

step 101 specifically includes that after the second upper equipment builds a security channel with the personalized device, the personalized device executes step 102 if the second upper equipment sends the personalized data package to the personalized device via the security channel; the personalized device executes step 103 if the second upper equipment sends the verification request to the personalized device via the security channel;

step 102 specifically is that the personalized device parses the personalized data package to obtain the personalized information, and writes the personalized information into the financial IC card, and returns the writing result of the personalized information to the second upper equipment via the security channel; and continues to waiting for receiving data from the second upper equipment;

step 103 specifically is that the personalized device read the time window and the dynamic verification code, and returns the time and the dynamic verification code to the second upper equipment via the security channel for verification, and receives the verification result returned from the second upper equipment via the security channel, and reads the personalized state from the financial IC card and stores the personalized state, and continues to wait for receiving the data from the second upper equipment if the verification result is success; and continues to wait for receiving the data from the second upper equipment if the verification result is failure;

in Embodiment 1, before the second upper equipment sends the personalized data package to the personalized device, the method further includes:

step t1, the third upper equipment generates or receives the first personalized information including the first master key; disperses the first master key to obtain the second dispersed key, organizes the second personalized information including the second dispersed key; and sends the second personalized information to the second equipment; and step t2, the second upper equipment organizes the personalized data package according to the second personalized information.

Or, before the second upper equipment sends the personalized data package to the personalized device, the method further includes:

step w1, the third upper equipment generates the dispersion factor according to the preset card identification information, disperses the preset first master key by using the dispersion factor to obtain the first dispersed key, organizes the first personalized information including the first dispersed key; and disperses the preset second master key by using the dispersion factor to obtain the second dispersed key, and organizes the second personalized information including the second dispersed key; and sends the second personalized information to the second upper equipment; and step w2, the second upper equipment organizes the personalized data package according to the second personalized information.

In Embodiment 1, that the upper equipment generates or receives the first personalized information including the first master key; and disperses the first master key to obtain the second dispersed key, and organizes the second personalized information including the second dispersed key, and organized personalized data package according to the second personalized information can be replaced by that the upper equipment generates or receives the first master key, and disperses the first master key to obtain the first dispersed key, and organizes the first personalized information including the first dispersed key; and disperses the first master key to obtain the second dispersed key, and organizes the second personalized information including the second dispersed key, and organizes the personalized data package according to the second personalized information.

Correspondingly, the upper equipment includes the second upper equipment and the third upper equipment;

that the upper equipment generates or receives the first master key, disperses the first master key to obtain the first dispersed key, and organizes the first personalized information including the first dispersed key; and disperses the first master key to obtain the second dispersed key, and organizes the second personalized information including the second dispersed key, and organizes the personalized data package according to the second personalized information specifically includes:

step y1, the third upper equipment generates or receives the first master key, disperses the first master key to obtain the first dispersed key, and organizes the first personalized information including the first dispersed key; disperses the first master key to obtain the second dispersed key, and organizes the second personalized information including the second dispersed key; and sends the second personalized information to the second upper equipment; and step y2, the second upper equipment organizes the personalized data package according to the second personalized information.

In the present invention, the second dispersed key is a key seed which applies for the dynamic verifying function of the financial IC card, the second dispersed key may be but not limit to a UDK (unique Data Encryption Algorithm key) key seed.

According to the present invention, there is provided a personalized method for a financial IC card with a dynamic verification code. The technical solutions as the claimed method can realize personalization of a financial IC card with a dynamic verification code.

Embodiment 2

According to Embodiment 2, it provides a personalized method for a financial IC card with a dynamic verification code, which applies to a personalized system which includes the first upper equipment, the second upper equipment, the third upper equipment and a personalized device.

In Embodiment 2, the first upper equipment is an upper equipment which applies to personalization of financial business of a financial IC card; specifically, the first upper equipment can be equipped with the first personalized program which applies to the personalization of the financial business of the financial IC card; and the first personalized program stores the first personalized information which applies to personalization of the financial business of the financial IC card, and the first personalized information includes the first master key;

the second upper equipment specifically is the upper equipment which applies to personalization of the dynamic verification function of the financial IC card; specifically, the second upper equipment can be equipped with the second personalized program which applies to the personalization of the dynamic verification function of the financial IC card.

The third upper equipment is configured to send the first personalized information including the first master key to the first upper equipment; and to send the second personalized information which applies to personalization of the dynamic verification function of the financial IC card to the second upper equipment.

Before the third sends the second personalized information which applies to personalization of the dynamic verifying function of the financial IC card to the second upper equipment, the method further includes:

the third upper equipment generates or receives the first personalized information including the first master key, sends the first personalized information to the first upper equipment; disperses the first master key to obtain the second dispersed key, and organizes the second personalized information which includes a main account, the second dispersed key, an expire data, a time window and a service code, and sends the second personalized information to the second upper equipment.

In Embodiment 2, the second dispersed key is the key seed which is configured to realize the dynamic verification function of the financial IC card, the second dispersed key may be but not limited to be the UDK (unique Data Encryption Algorithm key) key seed.

In Embodiment 2, the first upper equipment, the second upper equipment and the third upper equipment could be one upper equipment, or two of them is one upper equipment, the left is the other upper equipment; or they are three different upper equipment.

For instance, when the first upper equipment, the second equipment and the third equipment are one upper equipment, the main program in the upper equipment generates or receives the first personalized information including the first master key, invokes an interface in the first personalized program to send the first personalized information to the first personalized program; the main program in the upper equipment disperses the first master key to obtain the second dispersed key, organizes the second personalized information including the main account, the second dispersed key, the expire data, the time window and the service code, and invokes the interface in the second personalized program to send the second personalized information to the second personalized program.

In Embodiment 2, the personalized method for the financial IC card with the dynamic verification code specifically is a personalized method of the dynamic verification function of the financial IC card with the dynamic verification code, and the method includes a personalized process and a verification process;

the personalized process includes the following step.

Step 201, the second upper equipment organizes a handshake request including a handshake random number;

specifically, the second upper equipment generates a first random number and makes it as the handshake random number, organizes the handshake request including the handshake random number.

For instance, the second upper equipment generates the first random number 66 and makes 66 as the handshake random number, and organizes the handshake request A5 66 5A which includes the handshake random number.

Step 202, the second upper equipment sends the handshake request to the personalized device;

Step 203, the personalized device obtains the handshake random number from the handshake request, and encrypts the handshake random number which is in the handshake request by using a preset initial key to obtain a data transmission key;

preferably, in Embodiment 2, the personalized device executes 3DES (Triple Data Encryption Standard) encryption on the handshake random number in the handshake random number by using the preset initial key to obtain the data transmission key after the personalized device obtains the handshake random number from the handshake request.

For instance, the personalized device obtains the handshake random number 66 from the handshake request A5 66 5A, and executes 3DES encryption on the handshake random number 66 in the handshake request by using the preset initial key 00112233445566771122334455667788 2233 445566778899 to obtain the data transmission key CBCA695BD336CB9BAF3A9408D109183B 337383866AD1549C.

Step 204, the personalized device returns a handshake response to the second upper equipment.

For instance, the personalized device returns the handshake response 80 00 to the second upper equipment.

Step 205, the second upper equipment obtains the second personalized information, and organizes the personalized data package including the second personalized information.

In Embodiment 2, the second personalized information may specifically include the main account, the second dispersed key, the expire date, the time window and the service code, etc.

Specifically, the second personalized program in the second upper equipment injects the main account, the second dispersed key, the expire data, the time window and the service code which are stored in the second upper equipment according to a first preset sequence to obtain the second personalized information 00 01 02 03 04 05 06 07 08 09 08 07 06 05 04 03 02 01 00 01 08 02 11 06 06 06 11 22 33 44 55 66 77 88 88 77 66 55 44 33 22 11 5A 6E D9 BE 00 04 B0, and then organizes the personalized data package A5 00 35 01 00 31 00 01 02 03 04 05 06 07 08 09 08 07 06 05 04 03 02 01 0001 08 02 11 06 06 0611 22 33 44 55 66 77 88 88 77 66 55 44 33 22 115A 6E D9 BE 00 04 B0 01 which includes the second personalized information according to the first preset protocol.

Step 206, the second upper equipment encrypts the personalized data package by using the data transmission key of itself, and sends the encrypted personalized data package to the personalized device;

for instance, the second upper equipment uses the data transmission key of itself CBCA695BD336CB9BAF3A9408D109 183B337383866AD1549C to encrypt the personalized data package A5 00 35 01 00 31 00 01 02 03 04 05 06 07 08 09 08 07 06 05 04 03 02 01 0001 08 02 11 06 06 0611 22 33 44 55 66 77 88 88 77 66 55 44 33 22 115A 6E D9 BE 00 04 B0 01 to obtain the encrypted personalized data package 7CE41DA93B54B1C4B38E32DF2EBCB28F38471 BC25 B14A5EBBD1B20BFE742FE3AD9 34BA6D41FD8637CD44FE135797E2BC4D8EC EBD408674F 8, and sends the encrypted personalized data package to the personalized device.

In Embodiment 2, before step 206, the method further includes the second upper equipment uses the preset initial key to encrypt the first random number to obtain the data transmission key.

Preferably, the second upper equipment uses the preset initial key to execute 3DES encryption on the first random number to obtain the data transmission key.

Step 207, the personalized device uses the data transmission key to decrypt the received data to obtain the personalized data package;

for instance, the personalized device uses the data transmission key CBCA695BD336CB9BAF3A9408D109183B337383866AD1549C to decrypt the received data 7CE41DA93B54B1C4B38E32DF2EBCB28F38471BC25B14A5EBBD1B20BFE742FE3AD934BA6D41FD8637CD44FE135797E2BC4D8ECEBD408674F8 to obtain the plaintext of the personalized data package A5 00 35 01 00 31 00 01 02 03 04 05 06 07 08 09 08 07 06 05 04 03 02 01 0001 08 02 11 06 06 0611 22 33 44 55 66 77 88 88 77 66 55 44 33 22 115A 6E D9 BE 00 04 B0 01.

Step 208, the personalized device parses the personalized data package to obtain the second personalized information.

Specifically, the personalized device parses the personalized data package according to the first preset protocol to obtain the second personalized information, and obtains information such as the main account, the second dispersed key, the expire data, the time window and the service code from the second personalized information according to the first preset sequence.

For instance, the personalized device parses the personalized data package A5 00 35 01 00 31 00 01 02 03 04 05 06 07 08 09 08 07 06 05 04 03 02 01 0001 08 02 11 06 06 06 11 22 33 44 55 66 77 88 88 77 66 55 44 33 22 115A 6E D9 BE 00 04 B0 01 according to the first preset protocol to obtain the second personalized information 00 01 02 03 04 05 06 07 08 09 08 07 06 05 04 03 02 01 0001 08 02 11 06 06 06 11 22 33 44 55 66 77 88 88 77 66 55 44 33 22 115A 6E D9 BE 00 04 B0, and obtains the main account 00 01 02 03 04 05 06 07 08 09 08 07 06 05 04 03 02 01 00, the second dispersed key 11 22 33 44 55 66 77 88 88 77 66 55 44 33 22 11, the expire data 01 08 02 11, the time window 00 04 B0 and the service code 06 06 06 from the second personalized information according to the first preset sequence.

Step 209, the personalized device sends an obtaining card basic information instruction to the financial IC card, and executes step 210 if correct response returned from the financial IC card is received otherwise, executes step 217.

In Step 209, specifically, the personalized device generates the obtaining card basic information instruction according to the second preset protocol, sends the obtaining card basic information instruction to the financial IC card, and determines whether the correct response is received after the response returned from the financial IC card is received, and executes step 210 if the correct response is received; otherwise, executes step 217.

For instance, the personalized device generates the obtaining card basic information instruction 86021010 according to the second preset protocol, and sends the obtaining card basic information instruction to the financial IC card, after receiving the response AA0B1001100001270000250 507 from the financial IC card, executes step 210 when the correct response is received according to the second preset protocol.

Step 210, the personalized device determines the financial IC card is a financial IC card waiting for personalization according to the card basic information in the response returned by the financial IC card, if yes, executes step 211; otherwise, executes step 217.

Specifically, the personalized device parses the response returned by the financial IC card according to the second preset protocol to obtain the card basic information in the response, and determines whether the financial IC card is the financial IC card waiting for personalization, if yes, executes step 211; otherwise, executes step 217.

In Embodiment 2, the card basic information specifically includes a product category, a hardware program, a software version, a software small version, a random number, a custom information, other information, an algorithm identification, and binding ID number, etc. in which the product category, the hardware program, the software version, the software small version, each of the random number, the custom information, the other information, the algorithm identification and the binding ID number is one byte preferably.

More specifically, the personalized device parses the response returned from the financial IC card according to the second preset protocol to obtain the card basic information from the response returned from the financial IC card, and obtains the product category, the hardware program, the software version, the software small version, the random number, the custom information, other information, the algorithm identification and the binding ID number, and determines whether the financial IC card is the financial IC card waiting for personalization according to the other information, if the other information is the first preset field information, the financial IC card is the financial IC card waiting for personalization and executes step 211; otherwise, the financial IC card is not the financial IC card waiting for personalization, and executes step 217.

For instance, the personalization device parses the response returned from the financial IC card AA0B1001100001270 000250507 according to the second preset protocol to obtain the card basic information 0110000127000002505 from the response returned from the financial IC card, makes the card basic information 01, 10, 00, 01, 27, 00, 00, 25 and 05 as the product category, the hardware program, the software version, the software small version, the random number, the custom information, the other information, the algorithm identification and the binding ID number in sequence according to the second preset sequence, and if the other information 00 is the preset field information, the financial IC card is the financial IC card waiting for personalization, and executes step 211; otherwise, the financial IC card is not the financial IC card waiting for personalization, and executes step 217.

In Embodiment 2, the first preset field may be any byte of bytes from 00 to 0F.

Step 211, the personalized device sends a writing main account instruction to the financial IC card, and executes step 212 if the correct response returned from the financial IC card is received; otherwise, executes step 217.

Specifically, the personalized device generates the writing main account instruction according to the second protocol and the obtained main account, sends the writing main account instruction to the financial IC card, and determines whether the correct response is received according to the second preset protocol after the response returned from the financial IC card is received, if yes, executes step 212; otherwise, executes step 217.

In Embodiment 2, the writing main account instruction includes the main account in the second personalized information.

For instance, the personalized device generates the writing main account instruction 86151D000102030405060708090807060504030201001402010014 according to the second preset protocol and the obtained main account 00 01 02 03 04 05 06 07 08 09 08 07 06 05 04 03 02 01 00, and after sending the writing main account instruction to the financial IC card, and receiving the response AA02AAAA returned from the financial IC card, executes step 212 if determining the correct response is received according to the second preset protocol.

Step 212, the personalized device sends a writing expire data instruction to the financial IC card, and executes step 213 if the correct response returned from the financial IC card is received; otherwise, executes step 217.

Specifically, the personalized device generates the writing expire data instruction according to the second preset protocol and the obtained expire data, sends the writing expire data instruction to the financial IC card, and determines whether the correct response is received according to the second preset protocol after the response returned from the financial IC card is received, and executes step 213 if the correct response is received; otherwise, executes step 217.

In Embodiment 2, the writing expire date instruction includes the expire data in the second personalized information.

For instance, the personalized device generates the writing expire data instruction 86062D0108021137 according to the second preset protocol and the obtained expire date 01080211, after sending the writing expire date instruction to the financial IC card and receiving the response AA02AAAA returned from the financial IC card, executes step 213 if determines that the correct response is received according to the second preset protocol.

Step 213, the personalized device sends the writing service code instruction to the financial IC card, and executes step 214 if the correct response returned from the financial IC card is received; otherwise, executes step 217.

Specifically, the personalized device generates the writing service code instruction according to the second preset protocol and the obtained service code, and after sending the writing service code instruction to the financial card and receiving the response returned from the financial IC card, determines whether the correct response is received according to the second preset protocol, if yes, executes step 214; otherwise, executes step 217.

In Embodiment 2, the writing service code instruction includes the service code in the second personalized information.

For instance, the personalized device generates the writing service code instruction 86053D0606063B according to the second preset protocol and the obtained service code 060606, after sending the writing service code instruction to the financial IC card and receiving the response AA02AAAA returned from the financial IC card, and executes step 214 if determines that the correct response is received according to the second preset protocol.

Step 214, the personalized device sends a writing time window instruction to the financial IC card, and executes step 215 if the correct response returned from the financial IC card is received; otherwise, executes step 217.

Specifically, the personalized device generates the writing time window instruction according to the second preset protocol and the obtained time window, and sends the writing time window instruction to the financial IC card, after receiving the response returned from the financial IC card, determines whether the correct response is received according to the second preset protocol, and executes step 215 if the correct response returned from the financial IC card is received; otherwise, executes step 217.

In Embodiment 2, the writing time window instruction includes the time window in the second personalized information.

For instance, the personalized device generates the writing time window instruction according to the second preset protocol and the obtained time window 0004B0, and sends the writing time window instruction to the financial IC card, and after receiving the response AA02AAAA returned from the financial IC card, executes step 214 when determines the correct response is received according to the second preset protocol.

Step 215, the personalized device sends a writing second dispersed key instruction to the financial IC card, executes step 216 if the correct response returned from the financial IC card is received; otherwise, executes step 217.

Specifically, the personalized device generates the writing the second dispersed key instruction according to the second preset protocol and the obtained second dispersed key, sends the writing second dispersed key instruction to the financial IC card, and determines whether the correct response is received according to the second protocol after the response returned from the financial IC card is received, and executes step 216 if the correct response returned from the financial IC card is received; otherwise, executes step 217.

In Embodiment 2, the writing second dispersed key instruction includes the second dispersed key in the second personalized information.

For instance, the personalized device generates the writing second dispersed key instruction according to the second preset protocol and the obtained second dispersed key 1122334455667788 8877665544332211, sends the writing second dispersed key instruction 86121E1122334455667778 888776655443322111E to the financial IC card, and executes step 218 after the response AA02AA AA returned from the financial IC card is received and the correct response is received which is determined according to the second preset protocol.

Step 216, the personalized device generates writing second personalized information successful information, and returns the writing second personalized information successful information, which is encrypted by using the data transmission key, to the second upper equipment.

Specifically, the personalized device generates the writing second personalized information successful information according to the first preset protocol, and returns the writing personalized information successful information, which is encrypted by using the data transmission key, to the second upper equipment.

For instance, the personalized device generates the writing second personalized information successful information 5A0003800083 according to the first preset protocol, and encrypts the writing second writing information successful information by using the data transmission key CBCA695BD336CB9BAF3A9408D109 183B337383866AD1549C to obtain C002439FA95E5A 48, and returns C002439FA95E5A48 to the second upper equipment.

Step 217, the personalized device generates writing second personalized information unsuccessful information, and returns the writing second personalized information unsuccessful information to the second upper equipment after the writing second personalized information unsuccessful information is encrypted by using the data transmission key.

Specifically, the personalized device generates the writing second personalized information unsuccessful information according to the first preset protocol, and returns the writing second personalized information unsuccessful information to the second upper equipment after the writing second personalized information unsuccessful information is encrypted by using the data transmission key.

For instance, the personalized device generates the writing second personalized information unsuccessful information 5A0003800182, and encrypts the writing second personalized information unsuccessful information by using the data transmission key CBCA695BD336CB9BAF3A9408D10 9183B337383866AD1549C to obtain BC072A47AB48832D, and sends the BC072A47AB48832D to the second upper equipment.

The verification program includes:

Step 301, the second upper equipment organizes the handshake request including a handshake random number.

Specifically, the second upper equipment generates the second random number and makes it as the handshake random number, and organizes the handshake request including the handshake random number.

For instance, the second upper equipment generates the second random number 55 and makes 55 as the handshake random number, organizes the handshake request A5 55 5A which include the handshake random number.

Step 302, the second upper equipment sends the handshake request to the personalized device;

step 303, the personalized device obtains the handshake random number from the handshake request, encrypts the handshake random number which is in the handshake request by using the pre-appointed initial key to obtain the data transmission key;

preferably, in Embodiment 2, after obtaining the handshake random number from handshake request, the personalized device operates 3DES (Triple Data Encryption Standard) encryption on the handshake random number which is in the handshake request by using the pre-appointed initial key to obtain the data transmission key.

For instance, the personalized device obtains the handshake random number 55 from the handshake request A5 55 5A, executes 3DES encryption on the handshake random number 55 in the handshake request by using the pre-appointed initial key 00112233445566771122334455667788 2233445566778899 to obtain the data transmission key 1A7418E5D558F29BFC58B968E83E7 88F19D5E3FF9D561327.

Step 304, the personalized device returns a handshake response to the second upper equipment.

For instance, the personalized device returns the handshake response 80 00 to the second upper equipment.

Step 305, the second upper equipment organizes a verification request;

Specifically, the second upper equipment organizes the verification request according to the first preset protocol;

For instance, the second upper equipment organizes the verification request A50003020100 according to the first preset protocol.

Step 306, the second upper equipment encrypts the verification request by using the data transmission key of itself, and sends the encrypted verification request to the personalized device;

For instance, the second upper equipment encrypts the verification request by using the data transmission key of itself 29BFC58B968E83E788 F19D5E3FF9D561327 to obtain the encrypted verification request 702B5B5F6BB1BE4B, and sends 702B5B5F6BB1BE4B to the personalized device.

In Embodiment 2, before step 306, the method further includes: the second upper equipment encrypts the second random number by using the pre-appointed initial key to obtain the data transmission key.

Preferably, the second upper equipment executes 3DES (Triple Data Encryption Standard) encryption on the second random number by using the pre-appointed initial key to obtain the data transmission key.

Step 307, the personalized device decrypts the received data by using the data transmission key, and obtains the verification request;

For instance, the personalized device decrypts the received data 702B5B5F6BB1BE4B by using the data transmission key 1A7418E5D558F29BFC58B968E83E788F19D5E3 FF9D561327 to obtain plaintext of the verification request A50003020100.

Step 308, the personalized device sends a reading time window and dynamic verification code instruction to the financial IC card, executes step 309 if the correct response returned from the financial IC card is received otherwise, executes step 313.

Specifically, the personalized device generates the reading time window and dynamic verification code instruction according to the second preset protocol, sends the reading time window and dynamic verification code instruction to the financial IC card; determines whether the correct response is received according to the second preset protocol after the response returned from the financial IC card is received, if yes, executes step 309; otherwise, executes step 313.

For instance, the personalized device generates the reading time window and dynamic verification code instruction 86021F1F according to the second preset protocol, and sends the reading time window and dynamic verification code instruction to the financial IC card; and determines the correct response is received according to the second preset protocol after the response AA0808075AEBC7D40004B011 returned from the financial IC card is received, and executes step 309.

Step 309, the personalized device sends the time window and the dynamic verification code to the second upper equipment after encrypting the time window and the dynamic verification code, which are returned from the financial IC card, by using the data transmission key.

Specifically, the personalized device parses the response returned from the financial IC card according to the second preset protocol to obtain the time window and the dynamic verification code from the response; and organizes data being verified including the time window and the dynamic verification code according to the first preset protocol, and encrypts the data being verified by using the data transmission key to obtain the encrypted date being verified, sends the encrypted data being verified to the second upper equipment for verification, and receives a verification result returned from the second upper equipment.

For instance, the personalized device parses the response AA0808075AEBC7D 40004B011 returned from the financial IC card according to the second preset protocol, makes 00 04 B0 in the response returned from the financial IC card as the time window, and 08 08 07 in the response returned from the financial IC card as the dynamic verification code according to the third preset sequence; and organizes the data being verified 5A000C02010808075AEBC7D40004B01E which includes the time window and the dynamic verification code according to the first preset protocol, encrypts the data being verified by using the data transmission key 1A7418E5D558F29BFC58B968 E83E788F19D5E3FF9D561327 to obtain the encrypted data being verified 0CB582C17A80123A 05D5484F5C0F8ACE, and sends the encrypted data being verified to the second upper equipment for verification, and receives the verification result returned from the second upper equipment.

Step 310, the personalized device decrypts the verification result by using the data transmission key, and executes step 311 if the verification result is verification successful information; executes step 313 if the verification result is verification unsuccessful information.

Specifically, the personalized device decrypts the received verification result by using the data transmission key to obtain the decrypted verification result, and determines whether the decrypted verification result is the verification successful information according to the first preset protocol, if yes, executes step 311; otherwise, executes step 313.

For instance, the personalized device decrypts the received verification result BA90ACD6DA EC642A by using the data transmission key 1A7418E5D558F29BFC58B968E83E788F19D5E3FF 9D561327 to obtain the decrypted verification result A50003020203, after determines the decrypted verification result is the verification successful result according to the first preset protocol, executes step 311.

Step 311, the personalized device sends reading personalized state information instruction to the financial IC card, and executes step 312 if the correct response returned from the financial IC card is received; otherwise, executes step 313.

Specifically, the personalized device generates the reading personalized state information instruction according to the second preset protocol, and sends the reading personalized state information instruction to the financial IC card; determines whether the correct response is received according to the second preset protocol after the response returned from the financial IC card is received, if yes, executes step 312; otherwise, executes step 313.

For instance, the personalized device generates the reading personalized state information instruction 86022F2F according to the second preset protocol sends the reading personalized state information instruction to the financial IC card: after the response AA0B2F0101010101002E which is returned from the financial IC card, executes step 312 if determines the correct response is received according to the second preset protocol.

Step 312, the personalized device stores the personalized state information which is in the response returned from the financial IC card, generates the personalization successful information, and returns the personalization successful information to the second upper equipment after the personalization successful information is encrypted by using the data transmission key.

Specifically, the personalized device parses the response returned from the financial IC card according to the second preset protocol, obtains the personalized state information in the response returned from the financial IC card, stores the personalized state information which is in the response returned from the financial IC card, and generates the personalization successful information according to the first preset protocol, and returns the personalization successful information to the second upper equipment after the personalization successful information is encrypted by using the data transmission key.

In Embodiment 2, the personalized state information includes a number of limes for writing main account, a number of times for writing expire date, a number of times for writing service code, a number of times for writing time window, a number of times for writing second dispersed key and communication error, in which, each of the number of times for writing main account, the number of times for writing expire date, the number of times for writing service code, the number of times for writing time window, the number of times for writing second dispersed key and communication error is one byte preferably.

For instance, the personalized device parses the response AA0B2F01010101010 02E returned from the financial IC card according to the second preset protocol, obtains the personalized state information 010101010100 from the response returned from the financial IC card, makes 01, 01, 01, 01, 01, 00 in the personalized state information in the response returned from the financial IC card according to the fourth preset sequence as the number of times for writing main account, the number of times for writing expire date, the number of times for writing service code, the number of times for writing time window, the number of times for writing second dispersed key and communication error successively; generates personalization successful information according to the first preset protocol, and returns the personalization successful information to the second upper equipment after the personalization successful information is encrypted by using the data transmission key.

Step 313, the personalized device generates personalization unsuccessful information, and sends the personalization unsuccessful information to the second upper equipment after the personalization unsuccessful information is encrypted by using the data transmission key.

Specifically, the personalized device generates the personalization unsuccessful information according to the first preset protocol, and sends the personalization unsuccessful information to the second upper equipment after the personalization unsuccessful information is encrypted by using the data transmission key.

For instance, the personalized device generates the personalization unsuccessful information 5A00040203FFFA according to the first preset protocol, and sends the result 854806EBCFD82A29 which is obtained by encrypting the personalization unsuccessful information by using the data transmission key 1A7418E5D558F29B FC58B968E83E788F19D5E3FF9D561327 to the second upper equipment.

Embodiment 3

Figure 4:
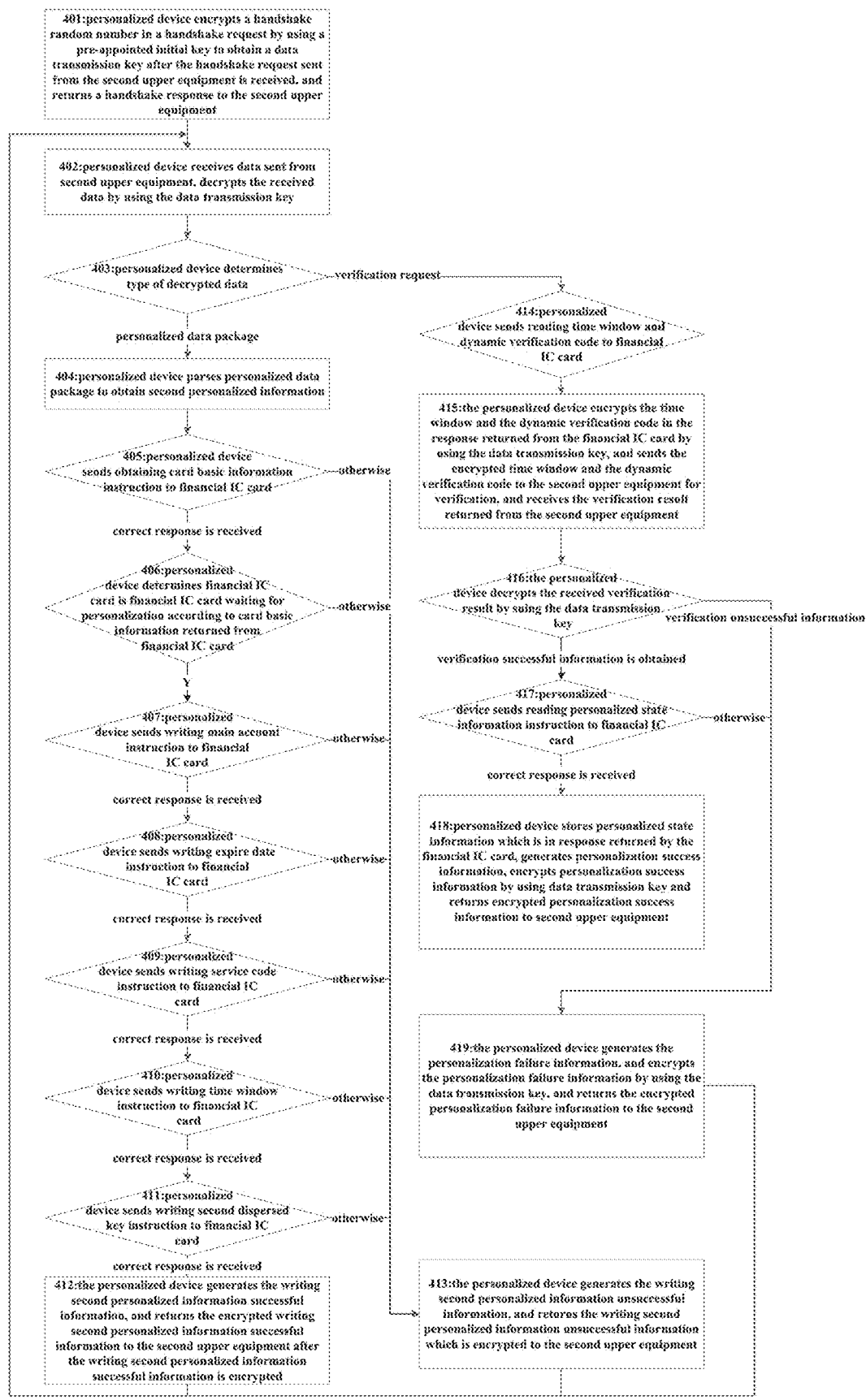
FIG. 4 is a flow diagram of a method for a financial IC card with a dynamic verification code according to Embodiment 3 of the present invention.

According to Embodiment 3, it provides a personalized method for a financial IC card with a dynamic verification code, as shown in FIG. 4, which includes following steps:

Step 401, a personalized device encrypts a handshake random number in a handshake request by using a pre-appointed initial key to obtain a data transmission key after the handshake request sent from the second upper equipment, and returns a handshake response to the second upper equipment.

Preferably, in Embodiment 3, the personalized device executes 3DES encryption on the handshake random number in the handshake request by using the pre-appointed initial key to obtain the data transmission key.

Step 402, the personalized device receives data sent from the second upper equipment, and decrypts the received data by using the data transmission key.

For instance, after receiving the data sent from the second upper equipment, the personalized device decrypts the received data 7CE41DA93B54B1C4B38E32DF2EBCB28F38471B C25B14A 5EBBD1B20BFE742FE3AD934BA 6D41FD8637CD44FE135797E2BC4D8ECEBD408674F8 by using the data transmission key CBCA695BD336CB9BAF3A9408D109183B33738 3866AD1549C to obtain the decrypted data A5 00 35 01 00 31 00 01 02 03 04 05 06 07 08 09 08 07 06 05 04 03 02 01 00 01 08 02 11 06 06 06 11 22 33 44 55 66 77 88 88 77 66 55 44 33 22 115A 6E D9 BE 00 04 B0 01.

For instance, after receiving the data sent from the second upper equipment, the personalized device decrypts the received data 702B5B5F 6BB1BE4B by using the data transmission key 1A7418E5D558F29BFC58B9 68E83E788F19D5E3FF9D561327 to obtain the decrypted data A50003020100.

Step 403, the personalized device determines a type of the decrypted data, executes step 404 if the decrypted data is personalized data package; executes step 414 if the decrypted data is the verification request.

Specifically, the personalized device determines the type of the decrypted data according to first preset protocol, executes step 404 if the decrypted data is the personalized data package; executes step 414 if the decrypted data is the verification request.

More specifically, the personalized device obtains data on the first preset position from the decrypted data, and determines the type of the decrypted data according to the data on the first preset position, the decrypted data is the personalized data package and executes step 404 if the data on the first preset position is the first preset identification; the decrypted data is the verification request and executes step 414 if the data on the first preset position is the second preset identification.

In Embodiment 3, the first preset position can be but not limited to be the third byte of the decrypted data, the first preset identification can be but not limited to be 35; the second preset identification can be but not limited to be 03.

For instance, if the data on the third byte (the first preset position) is obtained by the personalized device from the decrypted data A5 00 35 01 00 31 00 01 02 03 04 05 06 07 08 09 08 07 06 05 04 03 02 01 0001 08 02 11 06 06 0611 22 33 44 55 66 77 88 88 77 66 55 44 33 22 115A 6E D9 BE 00 04 B0 01 as the first preset identification is 35, the decrypted data is the personalized data package, and step 404 is executed.

For instance, if the data on the first preset position obtained by the personalized device from the decrypted data A50003020100 is the second preset identification, the decrypted data is the verification request and the personalized device executes step 414.

Step 404, the personalized device parses the personalized data package to obtain the second personalized information.

In Embodiment 3, the second personalized information can specifically include the main account, the second dispersed key, the expire date, the time window and the service code, etc.

Specifically, the personalized device parses the personalized data package according to the first preset protocol to obtain the second personalized information, and obtains information, such as the main account, the second dispersed key, the expire date, the time window and the service code, from the second personalized information according to the first preset sequence.

For instance, the personalized device parses the personalized data package A5 00 35 01 00 31 00 01 02 03 04 05 06 07 08 09 08 07 06 05 04 03 02 01 0001 08 02 11 06 06 0611 22 33 44 55 66 77 88 88 77 66 55 44 33 22 115A 6E D9 BE 00 04 B0 01 according to the first preset protocol to obtain the second personalized information 00 01 02 03 04 05 06 07 08 09 08 07 06 05 04 03 02 01 0001 08 02 11 06 06 0611 22 33 44 55 66 77 88 88 77 66 55 44 33 22 115A 6E D9 BE 00 04 B0, and obtains the main account 00 01 02 03 04 05 06 07 08 09 08 07 06 05 04 03 02 01 00, the second dispersed key 11 22 33 44 55 66 77 88 88 77 66 55 44 33 22 11, the expire date 01 08 02 11, the time window 00 04 B0 and the service code 06 06 06 from the second personalized information according to the first preset sequence.

In Embodiment 3, the second dispersed is a key seed which is configured to realize the dynamic verification function of the financial IC card, and can be but not limited to be a UDK key seed.

Step 405, the personalized device sends the obtaining card basic information instruction to the financial IC card, executes step 406 if the correct response returned from the financial IC card is received; otherwise, executes step 413.

In Embodiment 3, it needs to be noted that the financial IC card includes the first chip and the second chip, the first chip is configured to realize the personalization and the dynamic verification function of the financial IC card, the second chip is configured to realize the transaction function of the financial IC card; in Embodiment 3, communication between the personalized device and the financial IC card specifically is the communication between the personalized device and the first chip in the financial IC card.

Specifically, the personalized device generates the obtaining card basic information instruction according to the second preset protocol, and send the obtaining card basic information instruction to the financial IC card, and determines whether the correct response is received according to the second preset protocol after response returned from the financial IC card is received, if yes, executes step 406; otherwise, executes step 413.

For instance, the personalized device generates the obtaining card basic information instruction 86021010 according to the second preset protocol, sends the obtaining card basic information instruction to the financial IC card, and receives the response AA0B10011000012700000250 507 returned from the financial IC card, and executes step 406 if determines the response is the correct response according to the second preset protocol.

Step 406, the personalized device determines whether the financial IC card is a financial IC card waiting for personalization according to the response returned from the financial IC card, if yes, executes step 407; otherwise, executes step 413.

Specifically, the personalized device parses the response returned from the financial IC card according to the second preset protocol to obtain the card basic information in the response returned from the financial IC card, and determines whether the financial IC card is the financial IC card waiting for personalization, if yes, executes step 407; otherwise, executes step 413.

In Embodiment 3, the card basic information can specifically include a product category, a hardware program, a software version, a software small version, a random number, custom information, other information, an algorithm identification, and a binding ID number, etc. in which, each of the product category, the hardware program, the software version, the software small version, the random number, the custom information, the other information, the algorithm identification, the binding ID number is one byte preferably.

More specifically, the personalized device parses the response returned from the financial IC card according to the second preset protocol to obtain the card basic information in the response returned from the financial IC card which includes the product category, the hardware program, the software version, the software small version, the random number, the custom information, the other information, the algorithm identification, the binding ID number, and determines whether the financial IC card is the financial IC card waiting for personalization according to the other information, the financial IC card is the financial IC card waiting for personalization and step 407 is executed if the other information is the first preset field information; otherwise, the financial IC card is not the financial IC card waiting for personalization and step 413 is executed.

For instance, the personalized device parses the response AA0B100110000127 0000250507 returned from the financial IC card according to the second preset protocol to obtain the card basic information 011000012700002505 in the response returned from the financial IC card, makes 01, 10, 00, 01, 27, 00, 00, 25 and 05 in the card basic information as the product category, the hardware program, the software version, the software small version, the random number, the custom information, the other information, the algorithm identification and the binding ID number according to the second preset sequence, and if the other information 00 is the preset field information, the financial IC card is the financial IC card waiting for personalization and step 407 is executed; otherwise, the financial IC card is not the financial IC card waiting for personalization and step 413 is executed.

In Embodiment 3, the first preset field information can be any one byte from 00 to 0F.

Step 407, the personalized device sends the writing main account instruction, executes step 408 if the correct response returned from the financial IC card is received; otherwise, executes step 413.

Specifically, the personalized device generates the writing main account instruction according to the second preset protocol and the obtained main account and sends the writing main account instruction to the financial IC card, and determines whether the correct response is received according to the second preset protocol after the response returned from the financial IC card, if yes, executes step 408; otherwise, executes step 413.

In Embodiment 3, the writing main account instruction includes a main account in the second personalized information.

For instance, the personalized device generates the writing main account instruction 86151D00010203040506070809080706050403 02010014 according to the second preset protocol and the obtained main account 00 01 02 03 04 05 06 07 08 09 08 07 06 05 04 03 02 01 00, and sends the writing main account instruction to the financial IC card and receives the response AA02AAAA returned from the financial IC card, and executes step 408 when determining the correct response is received according to the second preset protocol.

Step 408, the personalized device sends the writing expire date instruction to the financial IC card, and executes step 409 if the correct response is received according the second preset protocol; otherwise, executes step 413.

Specifically, the personalized device generates the writing expire date instruction according to the second preset protocol and the obtained expire date, and sends the writing expire date instruction to the financial IC card, and determines whether the correct response is received according to the second preset protocol after the response returned from the financial IC card is received according to the second preset protocol, if yes, executes step 409; otherwise, executes step 413.

In Embodiment 3, the writing expire date instruction includes the expire date in the second personalized information.

For instance, the personalized device generates the writing expire date instruction 86062D0108021137 according to the second preset protocol and the obtained expire date 0108021 sends the writing expire date instruction to the financial IC card, and receives the response AA02AAAA returned from the financial IC card, and executes step 409 when the correct response is received is determined according to the second preset protocol.

Step 409, the personalized device sends the writing service code instruction to the financial IC card, and executes step 410 if the correct response returned from the financial IC card is received; otherwise, executes step 413.

Specifically, the personalized device generates the writing service code instruction according to the second preset protocol and the obtained service code, sends the writing service code instruction to the financial IC card, and determines whether the correct response is received, according to the second preset protocol after the response returned from the financial IC card is received, if yes, executes step 410; otherwise, executes step 413.

In Embodiment 3, the writing service code instruction includes the service code in the second personalized information.

For instance, the personalized device generates the writing service code instruction 86053D0606063B according to the second preset protocol and the obtained service code 060606, sends the writing service code instruction to the financial IC card, and receives the response AA02AAAA returned from the financial IC card, and executes step 410 if determines the correct response is received according to the second preset protocol.

Step 410, the personalized device sends the writing time window instruction to the financial IC card, and executes step 411 if the correct response returned from the financial IC card is received; otherwise, executes step 413.

Specifically, the personalized device generates the writing time window instruction according to the second preset protocol and the obtained time window, sends the writing time window instruction to the financial IC card, and determines whether the correct response is received according to the second preset protocol, if yes, executes step 411; otherwise, executes step 413.

In Embodiment 3, the writing time window instruction includes the time window in the second personalized information.

For instance, the personalized device generates the writing time window instruction according to the second preset protocol and the obtained time window 0004B0, and sends the writing time window instruction to the financial IC card, and receives the response AA02AAAA returned from the financial IC card, and executes step 411 if the correct response is received is determined according to the second preset protocol.

Step 411, the personalized device sends the writing second dispersed key instruction to the financial IC card, and executes step 412 if the correct response returned from the financial IC card is received; otherwise, executes step 413.

Specifically, the personalized device generates the writing second dispersed key instruction according to the second preset protocol and the obtained second dispersed key, and sends the writing second dispersed key instruction to the financial IC card, and determines whether the correct response is received according to the second preset protocol after the response returned from the financial IC card is received, if yes, executes step 412; otherwise, executes step 413.

In Embodiment 3, the writing second dispersed key instruction includes the second dispersed in the second personalized information.

For instance, the personalized device generates the writing second dispersed key instruction according to the second preset protocol and the obtained second dispersed key 11223344556677 8888776655443322211, sends the writing second dispersed key instruction 86121E11223344556677 88887766554433221111E to the financial IC card, and receives the response AA02AAAA returned from the financial IC card, and executes step 412 if determines the correct response is received according to the second preset protocol.

Step 412, the personalized device generates the writing second personalized information successful information, and returns the encrypted writing second personalized information successful information to the second upper equipment after the writing second personalized information successful information is encrypted, and returns to step 402.

Specifically, the personalized device generates the writing second personalized information successful information according to the first preset protocol, and returns the encrypted writing second personalized information successful information to the second upper equipment after the writing second personalized information successful information is encrypted, and returns to step 402.

For instance, the personalized device generates the writing second personalized information successful information 5A0003800083 according to the first preset protocol, encrypts the writing second personalized information successful information by using the data transmission key CBCA695BD336CB9BAF3A9408D1 09183B337383866AD1549C to obtain C002439FA95E5A48, and returns C002439FA95E5A48 to the second upper equipment.

Step 413, the personalized device generates the writing second personalized information unsuccessful information, and returns the writing second personalized information unsuccessful information which is encrypted to the second upper equipment, and returns to step 402.

Specifically, the personalized device generates the writing second personalized information unsuccessful information according to the first preset protocol, and returns the writing second personalized information unsuccessful information which is encrypted by using the data transmission key to the second upper equipment, and returns to step 402.

For instance, the personalized device generates the writing second personalized information unsuccessful information 5A0003800182, and encrypts the writing second personalized information unsuccessful information by using the data transmission key CBCA695BD336CB9BAF3A9408D 109183B337383866AD1549C to obtain BC072A47AB48832D, and returns BC072A47AB48832D to the second upper equipment, and returns to step 402.

Step 414, the personalized device sends the reading time window and dynamic verification code instruction to the financial IC card, and executes step 415 if the correct response returned from the financial IC card is received; otherwise, executes step 419.

Specifically, the personalized device generates the reading time window and dynamic verification code instruction according to the second preset protocol, and sends the writing time window and dynamic verification code instruction to the financial IC card; and determines whether the response returned from the financial IC card is the correct response according to the second preset protocol after receiving the response returned from the financial IC card is received, if yes, executes step 415; otherwise, executes step 419.

For instance, the personalized device generates the reading time window and dynamic verification code instruction 86021F1F according to the second preset protocol, sends the reading time window and dynamic verification code instruction to the financial IC card; after receiving the response AA0808075AEBC7D40004B011 returned from the financial IC card, and executes step 415 if determines that the response received is the correct response according to the second preset protocol.

Step 415, the personalized device encrypts the time window and the dynamic verification code in the response returned from the financial IC card by using the data transmission key, and sends the encrypted time window and the dynamic verification code to the second upper equipment for verification, and receives the verification result returned from the second upper equipment.

Specifically, the personalized device parses the response returned from the financial IC card according to the second preset protocol to obtain the time window and the dynamic verification code in the response; organizes data being verified including the time window and the dynamic verification code according to the first preset protocol, encrypts the data being verified by using the data transmission key to obtain the data being verified which is encrypted, and sends the data being verified which is encrypted to the second upper equipment for verification, and receives a verification result returned from the second upper equipment.

For instance, the personalized device parses the response AA0808075AEBC7D4 0004B011 returned from the financial IC card according to the second preset protocol, makes 00 04 B0 in the response returned by the financial IC card as the time window, and 08 08 07 in the response returned from the financial IC card as the dynamic verification code according to the third preset sequence; organizes the data being verified 5A000C02010808075AEBC7D40004B01E including the time window and the dynamic verification code according to the first preset protocol, encrypts the data being verified by using the data transmission key 1A7418E5D558F29BFC58B968E83E7 88F19D5E3FF9D561327 to obtain the data being verified which is encrypted 0CB582C17A80123 A05D5484F5C0F8ACE, and sends the data being verified which is encrypted to the second upper equipment for verification, and receives the verification result returned from the second upper equipment.

Step 416, the personalized device decrypts the received verification result by suing the data transmission key, executes step 417 if the verification success information is obtained; and executes step 419 if the verification failure information is obtained.

Specifically, the personalized device decrypts the received verification result by using the data transmission key to obtain the decrypted verification result, and determines whether the decrypted verification result is the verification success information according to the first preset protocol, if yes, executes step 417; and executes step 419 if the decrypted verification result is the verification failure information.

For instance, the personalized device decrypts the received verification result BA90ACD6DA EC642A by using the data transmission key 1A7418E5D558F29BFC58B968E83E788F19D5E3FF9 D561327 to obtain the decrypted result A50003020203, and executes step 417 if determines that the decrypted verification result is the verification success information according to the first preset protocol.

Step 417, the personalized device sends the reading personalized state information instruction according to the second preset protocol, and executes step 418 if the correct response returned from the financial IC card is received; otherwise, executes step 419.

Specifically, the personalized device generates the reading personalized state information instruction according to the second preset protocol, and sends the reading personalized state information instruction to the financial IC card; after response returned from the financial IC card is received, determines whether the correct response is received according to the second preset protocol, if yes, executes step 418; otherwise, executes step 419.

For instance, the personalized device generates the reading personalized state information instruction 86022F2F according to the second preset protocol, sends the reading personalized state information instruction to the financial IC card; and after receiving the response AA0B2F0101010101002E returned from the financial IC card, executes step 418 if determines that the correct response is received according to the second preset protocol.

Step 418, the personalized device stores the personalized state information in the response returned from the financial IC card, and generates the personalization success information, and returns the personalization success information to the second upper equipment after the personalization success information is encrypted by using the data transmission key.

Specifically, the personalized device parses the response returned from the financial IC card according to the second preset protocol, and obtains the personalized state information from the response returned from the financial IC card, stores the personalized state information which is in the response returned from the financial IC card, and generates the personalization success information according to the first preset protocol, and encrypts the personalization success information by using the data transmission key and returns the encrypted personalization success information to the second upper equipment.

In Embodiment 3, the personalized state information includes a number of times for writing main account, a number of times for writing expire date, a number of times for writing service code, a number of times for writing time window, a number of times for writing second dispersed key and a number of times for communication error, in which, each of the number of times for writing main account, the number of times for writing expire date, the number of times for writing service code, the number of times for writing time window, the number of times for writing second dispersed key and the number of times for communication error is preferably one byte.

For instance, the personalized device parses the response AA0B2F0101010101002E returned from the financial IC card according to the second preset protocol, obtains the personalized state information 010101010100 from the response returned from the financial IC card, and makes 01, 01, 01, 01, 01, 00 of the personalized state information in the response returned from the financial IC card as the number of times for writing main account, the number of times for writing expire date, the number of times for writing service code, the number of times for writing time window the number of times for writing the second dispersed key and number of times for communication error; and generates the personalization success information according to the first preset protocol, and returns the personalization success information which is encrypted by using the data transmission key to the second upper equipment.

Step 419, the personalized device generates the personalization failure information, and encrypts the personalization failure information by using the data transmission key, and returns the encrypted personalization failure information to the second upper equipment, and returns to step 402.

Specifically, the personalized device generates the personalization failure information according to the first preset protocol, and returns the personalization failure information after it is encrypted by using the data transmission key to the second upper equipment.

For instance, the personalized device generates the personalization failure information 5A0004 0203FFFA according to the first preset protocol, encrypts the personalization failure information 5A00040203FFFA by using the data transmission key 1A7418E5D558F29BFC58B968E83E788F1 9D5E3FF9D561327 to obtain the result 854806EBCFD82A29, and returns the result to the second upper equipment.

Embodiment 4

Figure 5:
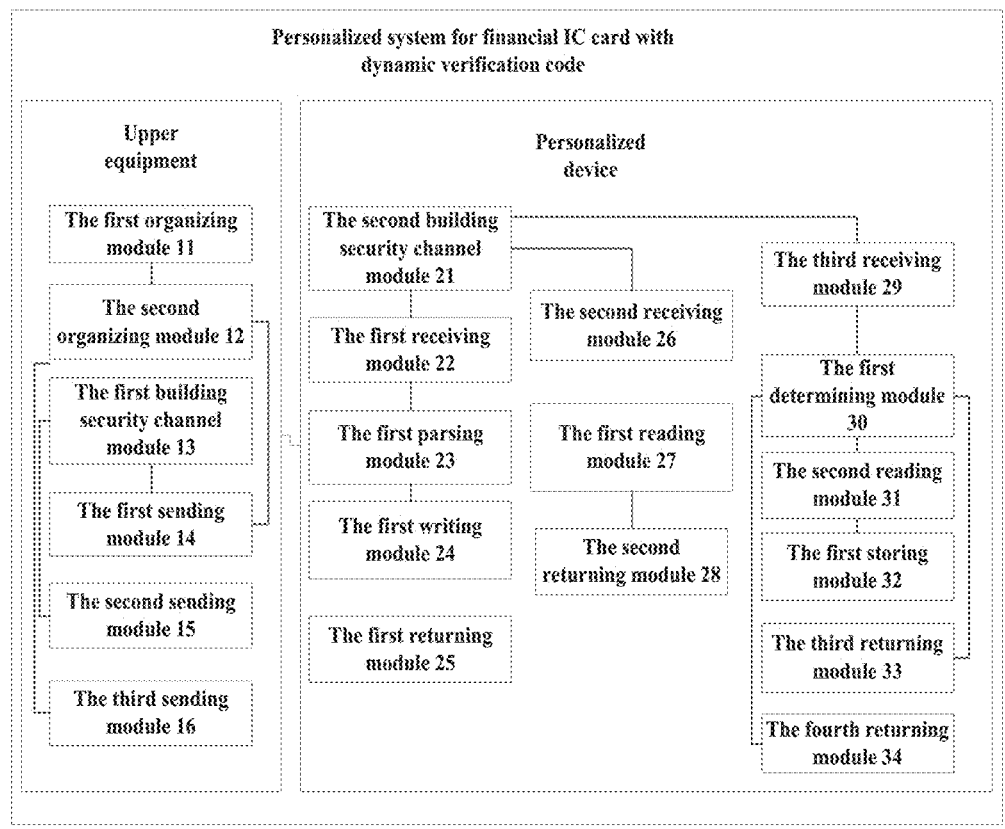
FIG. 5 is a structural diagram of a system for a financial IC card with a dynamic verification code according to Embodiment 4 of the present invention.

According to Embodiment 4, it provides a personalization system of a financial IC card with a dynamic verification code, as shown in FIG. 5, the system includes an upper equipment and a personalized device;

the upper equipment includes the first organizing module 11, the second organizing module 12, the first building security channel module 13, the first sending module 14, the second sending module 15 and the third sending module 16;

the personalized device includes the second building security channel module 21, the first receiving module 22, the first parsing module 23, the first writing module 24, the first returning module 25, the second receiving module 26, the first reading module 27, the second returning module 28, the third receiving module 29, the first determining module 30, the second reading module 31, the first storing module 32, the third returning module 33 and the fourth returning module 34;

the first organizing module 11 which is configured to generate or receive the first personalized information including the first master key; and disperse the first master key to obtain the second dispersed key, and organize the second personalized information including the second dispersed key;

the second organizing module 12 which is configured to organize the personalized data package according to the second personalized information organized by the first organizing module 11;

the first building security channel module 13 which is configured to build a security channel with the personalized device;

the first sending module 14 which is configured to send the personalized data package organized by the second organizing module 12 to the personalized device via the security channel built by the first building security channel module 13;

the second sending module 15 which is configured to send a verification request to the personalized device via the security channel built by the first building security channel module 13;

the third sending module 16 which is configured to send the verification result to the personalized device via the security channel built by the first building security channel module 13;

the second building security channel module 21 which is configured to build a security channel with the upper equipment;

the first receiving module 22 which is configured to receive the personalized data package from the upper equipment via the security channel built by the second building security channel module 21;

the first parsing module 23 which is configured to parse the personalized data package received by the first receiving module 22 to obtain the second personalized information;

the first writing module 24 which is configured to write the second personalized information obtained by the first parsing module 23 into the financial IC card;

the first returning module 25 which is configured to return a writing result of the second personalized information to the upper equipment via the security channel;

the second receiving module 26 which is configured to receive the verification request via the security channel;

the first reading module 27 which is configured to read time window and a dynamic verification code from the financial IC card;

the second returning module 28 which is configured to return the time window and the dynamic verification code read by the first reading module 27 via the security channel to the upper equipment;

the third receiving module 29 which is configured to receive the verification result returned by the upper equipment via the security channel;

the first determining module 30 which is configured to determine a type of the verification result received by the third receiving module 29;

the second reading module 31 which is configured to read the personalized state from the financial IC card when the first determining module 30 determines verification result which is received via the security channel is the verification successful;

the first storing module 32 which is configured to store the personalized state, which is read by the second reading module 31, returned from the financial IC card;

the third returning module 33 which is configured to return the personalization success information to the upper equipment via the security channel when the third determining module 30 determines that the verification result is successful;

the fourth returning module 34 which is configured to return personalization failure information to the upper equipment via the security channel when the first determining module 30 determines that the verification result is unsuccessful.

Furthermore, the upper equipment includes the second upper equipment and the third upper equipment;

the third upper equipment includes the first organizing module 11 and the fourth sending module;

the second upper equipment includes the fourth receiving module and the second organizing module 12, the first security channel module, the first sending module 14, the second sending module 15 and the third sending module 16;

the fourth sending module which is configured to send the second personalized information organized by the first organizing module 11 to the second upper equipment;

the fourth receiving module which is configured to receive the second personalized information from the third upper equipment;

the second organizing module 12 which is configured to organize the personalized data package according to the second personalized information received by the fourth receiving module.

In Embodiment 4, the first organizing module 11 can be replaced by the third organizing module;

the third organizing module which is configured to generate dispersed factor according to a preset card identification information, disperse a preset first master key by using the dispersed factor to obtain the first dispersed key, organize the first personalized information which include the first dispersed key; and disperse a preset second master key by using the dispersed factor to obtain the second dispersed key, and organize the second personalized information which includes the second dispersed key;

the second organizing module 12 which is configured to organize the personalized data package according to the second personalized information which is organized by the third organizing module.

Furthermore, the upper equipment includes the second upper equipment and the third upper equipment;

the third upper equipment includes the third organizing module and the fifth sending module;

the second upper equipment includes the fifth receiving module, the second organizing module 12, the first security channel module, the first sending module 14, the second sending module 15 and the third sending module 16;

the fifth sending module which is configured to send the second personalized information organized by the third organizing module to the second upper equipment;

the fifth receiving module which is configured to receive the second personalized information from the third upper equipment;

the second organizing module 12 is specifically configured to organize the personalized data package according to the second personalized information received by the fifth receiving module.

In Embodiment 4, the first building security channel module 13 includes the first sending unit and the first receiving unit;

the second building security channel module 21 includes the second receiving unit, the second sending unit and the first encrypting unit;

the first sending unit which is configured to send a handshake request which includes a handshake random number to the personalized device;

the first receiving unit which is configured to receive a handshake response returned from the personalized device;

the second receiving unit which is configured to receive the handshake request from the upper equipment;

the first encrypting unit which is configured to encrypt the handshake random number in the handshake request which is received by the second receiving unit by using an initial key which is pre-appointed with the upper equipment to obtain the data transmission key;

the second sending unit which is configured to send the handshake response to the upper equipment;

the first sending module 14 which is configured to encrypt the personalized data package organized by the second organizing module 12 by using the data transmission key of the upper equipment, and send the encrypted personalized data package to the personalized device;

the second sending module 15 which is configured to encrypt the verification request by using the data transmission key of the upper equipment, and send the encrypted verification request to the personalized device;

the third sending module 16 which is configured to encrypt the verification result by using the data transmission key of the upper equipment, and send the encrypted verification result to the personalized device;

the personalized device further includes the first decrypting module, the second decrypting module and the third decrypting module;

the first receiving module 22 is specifically configured to receive the encrypted personalized data package from the upper equipment;

the first decrypting module which is configured to decrypt the encrypted personalized data package which is received by the first receiving module 22;

the first decrypting module 23 is specifically configured to parse the decrypted personalized data package obtained by the first decrypting module to obtain the second personalized information;

the first returning module 25 is specifically configured to encrypt the second personalized information writing result by using the data transmission key obtained by the first encrypting unit, and return the encrypted second personalized information writing result to the upper equipment;

the second receiving module 26 is specifically configured to receive the encrypted verification request from the upper equipment;

the second decrypting module which is configured to decrypt the encrypted verification request received by the second receiving module 26;

the second returning module 28 is specifically configured to return the time window and the dynamic verification code which are read, after that are encrypted by the first reading module 27 by using the data transmission key obtained by the first encrypting unit, to the upper equipment;

the third receiving module 29 is specifically configured to receive the encrypted verification result from the upper equipment;

the third decrypting module which is configured to decrypt the encrypted verification result which is received by the third receiving module 29;

the first determining module 30 is specifically configured to determine a type of the verification result which is decrypted by the third decrypting module;

the third returning module 33 is specifically configured to return the personalization success information, which is encrypted by using the data transmission key, to the upper equipment when the first determining module 30 determines the verification result is success;

the fourth returning module 34 which is configured to return the personalization failure information, which is encrypted by using the data transmission key, to the upper equipment when the first determining module determines the verification result is failure.

Furthermore, the first encrypting unit is specifically configured to execute 3DES encryption on the handshake random number in the handshake request which is received by the second receiving module by using the initial key which is pre-appointed with the upper equipment to obtain the data transmission key.

In Embodiment 4, the second personalized information further includes the master account, the expire date, the time window, and the service code.

In Embodiment 4, the first writing module 24 includes the third sending unit, the third receiving unit, the first determining unit, the fourth sending unit, the fourth receiving unit, the second determining unit, the fifth sending unit, the fifth receiving unit, the third determining unit, the sixth sending unit, the sixth receiving unit, the fourth determining unit, the seventh sending unit, the seventh receiving unit and the fifth determining unit;

the third sending unit which is configured to send the writing master account instruction to the financial IC card;

the third receiving unit which is configured to receive the response returned by the financial IC card;

the first determining unit which is configured to determine whether the response received by the third receiving unit is a correct response;

the fourth sending unit which is configured to send the writing expire date instruction to the financial IC card when the first determining unit determines the determination is yes;

the fourth receiving unit which is configured to receive the response returned from the financial IC card;

the second determining unit which is configured to determine whether the response received by the fourth receiving unit is the correct response;

the fifth sending unit which is configured to send the writing service code instruction to the financial IC card after the second determining unit determines the determination is yes;

the fifth receiving unit which is configured to receive the response returned by the financial IC card;

the third determining unit which is configured to determine whether the response received by the fifth receiving unit is the correct response;

the sixth sending unit which is configured to send the writing time window instruction to the financial IC card after the third determining unit determines the determination is yes;

the sixth receiving unit which is configured to receive the response returned from the financial IC card;

the fourth determining unit which is configured to determine whether the response received by the sixth receiving unit is the correct response;

the seventh sending unit which is configured to send the writing second dispersed key instruction to the financial IC card after the fourth determining unit determines the determination is yes;

the seventh receiving unit which is configured to receive the response returned from the financial IC card;

the fifth determining unit which is configured to determine whether the response received by the seventh receiving unit is the correct response;

the first returning module 25 is specifically configured to return the writing second personalized information successful information to the upper equipment via the security channel after the fifth determining unit determines that the result is yes; and return the writing second personalized information unsuccessful information to the upper equipment via the security channel after the first determining unit or the second determining unit or the third determining unit or the fourth determining unit or the fifth determining unit determines that the result is no.

in Embodiment 4, the personalized device further includes the second determining unit and an error reporting module;

the second determining module which is configured to read card basic information from the financial IC card and determine whether the financial IC card is a financial IC card waiting for personalization according to the card basic information;

the first writing module 24 is specifically configured to write the second personalized information obtained by the first parsing module 23 into the financial IC card after the second determining module determines that the result is yes;

the error reporting module which is configured to report error after the determining module determines that the result is no.

In Embodiment 4, the card basic information includes a product category, a hardware program, a software version, a software small version, a random number, custom information, other information, an algorithm identification and one or multiple of bond IC number.

In Embodiment 4, the first reading module 27 is specifically configured to send the reading time window and dynamic verification code instruction to the financial IC card; and to receive the time window and the dynamic verification code from the financial IC card.

In Embodiment 4, the second reading module 31 is specifically configured to send the reading personalized state information instruction to the financial IC card when the first determining module 30 determines the verification result, which is returned from the upper equipment and received via the security channel is success, and to receive the personalized state information in the response returned from the financial IC card.

In Embodiment 4, the personalized state information includes a number of times for writing master account, a number of times for writing expire date, a number of times for writing service code, a number of times for writing time window, one of or multiple of a number of times for writing second dispersed key and a number of times of communication error.

In Embodiment 4, the first organizing module 11 can be replaced by the fourth organizing module;

the fourth organizing module which is configured to generate or receive the first master key, and disperse the first master key to obtain the first dispersed key, organize the first personalized information including the first dispersed key; and to disperse the first master key to obtain the second dispersed key, and organize the second personalized information including the second dispersed key, and organize the personalized data package according to the second personalized information; and the second organizing module 12 which is configured to organize the personalized data package according to the second personalized information organized by the fourth organizing module.

Correspondingly, the upper equipment can include the second upper equipment and the third upper equipment.

The third upper equipment includes a fourth organizing module and a sixth sending module.

The second upper equipment includes the sixth receiving module, the second organizing module 12, the first security channel module 13, the first sending module 14, the second sending module 15 and the third sending module 16.

The sixth sending module which is configured to send the second personalized information organized by the fourth organizing module to the second upper equipment.

The sixth receiving module which is configured to receive the second personalized information from the third upper equipment.

The second organizing module 12 is specifically configured to organize the personalized data package according to the second personalized information received by the sixth receiving module.

According to Embodiment 4 of the present disclosure, it provides a personalized system for a financial IC card with a dynamic verification code, which can realize the personalization of the financial IC card with the dynamic verification code.

The above are only preferred embodiments of the present disclosure, however, the scope of protection of the present disclosure is not limited thereto. Any modification or substitution that can be easily envisaged by those of skill in the art within the technical scope disclosed by the present disclosure is intended to be included within the protection scope of the present disclosure. Therefore, the scope of protection of the present disclosure should be based on the scope of protection of the appended claims.

The invention claimed is:

1. A method for personalizing a financial IC card with a dynamic verification code, applying for a personalized system including an upper computer and a personal device, wherein said method comprises the following steps:
   s1) building, by the personal device, a security channel with the upper computer, then executing step s2) when the upper computer sends a personalized data package to the personal device via the security channel; and executing step s3) when the upper computer sends a verification request to the personal device via the security channel;
   s2) parsing, by the personal device, the personalized data package so as to obtain a second personalized information, writing the second personalized information into the financial IC card, and returning the second personalized information writing result to the upper computer via the security channel; and waiting for receiving data sent from the upper computer; and
   s3) reading, by the personal device, a time window and a dynamic verification code from the financial IC card, and returning the time window and the dynamic verification code to the upper computer for verification via the security channel, and receiving a verification result returned from the upper computer via the security channel, reading a personalized state from the financial IC card and storing the personalized state if the verification result is successful, and returning personalization successful information to the upper computer via the security channel; while returning personalization failure information to the upper computer via the security channel if the verification result is failure;
   before the upper computer sends the personalized data package to the personal device, the method further comprises:
   generating or receiving, by the upper computer, a first personalized information including a first master key; dispersing the first master key so as to obtain a second dispersed key, organizing the second personalized information including the second dispersed key, and organizing the personalized data package according to the second personalized information.

2. The method as claimed in claim 1, wherein the upper computer comprises a second upper computer and a third upper computer;

the upper computer which is mentioned in steps s1), s2) and s3) specifically is the second upper computer;
generating or receiving, by the upper computer, the first personalized information including the first master key; dispersing the first master key to obtain the second dispersed key, organizing the second personalized information including the second dispersed key, and organizing the personalized data package according to the second personalized information specifically comprises the following steps:
t1) generating or receiving, by the third upper computer, the first personalized information including the first master key; dispersing the first master key to obtain the second dispersed key, organizing the second personalized information including the second dispersed key; and sending the second personalized information to the second upper computer; and
t2) organizing, by the second upper computer, the personalized data package according to the second personalized information.

3. The method as claimed in claim 1, wherein, that the upper computer generates or receives the first personalized information including the first master key; disperses the first master key to obtain the second dispersed key, and organizes the second personalized information including the second dispersed key, and organizes the personalized data package according to the second personalized information is replaced with such features that generating, by the upper computer, a dispersing factor according to preset card identification information, dispersing a preset first master key by using the dispersing factor to obtain the first dispersed key, organizing the first personalized information including the first dispersed key; dispersing a preset master key by using the dispersing factor to obtain the second dispersed key, and organizing the second personalized information including the second dispersed key; and organizing the personalized data package according to the second personalized information.

4. The method as claimed in claim 3, wherein the upper computer comprises the second upper computer and the third upper computer;

the upper computer which is mentioned in steps s1), s2) and s3) specifically is the second upper computer;
generating, by the upper computer, the dispersing factor according to a preset card account number and a card serial number, dispersing the preset first master key by using the dispersing factor to obtain the first dispersed key, organizing the first personalized information including the first dispersed key, dispersing the preset master key by using the dispersing factor to obtain the second dispersed key, and organizing the second personalized information including the second dispersed key; and organizing the personalized data package according to the second personalized information specifically includes the following steps:
w1) generating, by the third upper computer, the dispersing factor according to the preset card identification information, dispersing the preset master key by using the dispersing factor to obtain the first dispersed key, organizing the first personalized information including the first dispersed key; dispersing the preset second master key by using the dispersing factor to obtain the second dispersed key, and organizing the second personalized information including the second dispersed key; and sending the second personalized information to the second upper computer; and
w2) organizing, by the second upper computer, the personalized data package according to the second personalized information.

5. The method as claimed in claim 1, wherein that the upper computer generates or receives the first personalized information including the first master key; disperses the first master key to obtain the second dispersed key, organizes the second personalized information including the second dispersed key, and organizes the personalized data package according to the second personalized information is replaced with such features that generating or receiving, by the upper computer, the first master key, dispersing the first master key to obtain the first dispersed key, organizing the first personalized information including the first dispersed key; dispersing the first master key to obtain the second dispersed key, organizing the second personalized information including the second dispersed key, and organizing the personalized data package according to the second personalized information.

6. The method as claimed in claim 5, wherein the upper computer comprises the second upper computer and the third upper computer;

the upper computer which is mentioned in step 1), step 2) and step 3) specifically is the second upper computer;
generating or receiving, by the upper computer, the first master key, dispersing the first master key to obtain the first dispersed key, organizing the first personalized information including the first dispersed key; dispersing the first master key to obtain the second dispersed key, organizing the second personalized information including the second dispersed key, and organizing the personalized data package according to the second personalized information specifically comprises the following steps:
y1) generating or receiving, by the third upper computer, the first master key, dispersing the first master key to obtain the first dispersed key, organizing the first personalized information including the first dispersed key; dispersing the first master key to obtain the second dispersed key, organizing the second personalized information including the second dispersed key; and sending the second personalized information to the second upper computer; and
y2) organizing, by the second upper computer, the personalized data package according to the second personalized information.

7. The method as claimed in claim 1, wherein before step s1), said method further comprises building the security channel, by the upper computer, with the personal device; building the security channel comprises the following steps:
a1) sending, by the upper computer, a handshake request including a handshake random number to the personal device; and
a2) encrypting, by the personal device, the handshake random number in the handshake request by using the pre-appointed initial key to obtain a data transmission key; and returning a handshake response to the upper computer;
sending, by the upper computer, the personalized data package to the personal device via the security channel specifically is that encrypting, by the upper computer, the personalized data package by using the data transmission key of the upper computer, and sending the encrypted personalized data package to the personal device;

sending, by the upper computer, the verification request to the personal device via the security channel specifically is that encrypting, by the upper computer, the verification request by using the data transmission key of the upper computer, and sending the encrypted verification request to the personal device;

before parsing, by the personal device, the personalized data package to obtain the second personalized information, the method further comprises decrypting, by the personal device, the encrypted personalized data by using the data transmission key of the personal device;

before reading, by the personal device, the time window and the dynamic verification code from the financial IC card, the method further comprises decrypting, by the personal device, the encrypted verification request by using the data transmission key of the personal device;

returning the second personalized information writing result to the upper computer via the security channel specifically is that encrypting the second personalized information writing result by using the data transmission key and returning the encrypted second personalized information writing result to the upper computer;

returning the time window and the dynamic verification code to the upper computer via the security channel specifically is encrypting the time window and the dynamic verification code by using the data transmission key, and returning the encrypted time window and the encrypted dynamic verification code to the upper computer;

receiving the verification result returned from the upper computer via the security channel specifically is that receiving the verification result returned from the upper computer, and decrypting the received verification result by using the data transmission key;

returning the personalization successful information via the security channel to the upper computer specifically is encrypting the personalization successful information by using the data transmission key, and returning the encrypted personalization successful information to the upper computer; and returning the personalization failure information via the security channel to the upper computer specifically is encrypting the personalization failure information by using the data transmission key, and returning the encrypted personalization failure information to the upper computer.

8. The method as claimed in claim 1, wherein before writing the second personalized information into the financial IC card, said method further comprises reading, by the personal device, card basic information from the financial IC card, and determining whether the financial IC card is a financial IC card waiting for being personalized according to the card basic information, if yes, writing the second personalized information into the financial IC card; otherwise, reporting an error.

9. The method as claimed in claim 1, wherein reading, by the personal device, the time window and the dynamic verification code from the financial IC card and saving the same comprises sending, by the personal device, a reading time window and dynamic verification code instruction to the financial IC card, and receiving the time window and the dynamic verification code returned from the financial IC card.

10. The method as claimed in claim 1, wherein reading the personalized state from the financial IC card and storing the personalized state comprises: sending the reading personalized state information instruction to the financial IC card, and storing the personalized state information which is in the response returned from the financial IC card.

* * * * *